(12) United States Patent
Raisch et al.

(10) Patent No.: US 10,901,910 B2
(45) Date of Patent: Jan. 26, 2021

(54) MEMORY ACCESS BASED I/O OPERATIONS

(71) Applicant: INTERNATIONAL BUSINESS MACHINES CORPORATION, Armonk, NY (US)

(72) Inventors: Christoph Raisch, Gerlingen (DE); Carsten Otte, Stuttgart (DE); Matthias Brachmann, Weil der Stadt (DE); Marco Kraemer, Sindelfingen (DE)

(73) Assignee: International Business Machines Corporation, Armonk, NY (US)

( * ) Notice: Subject to any disclaimer, the term of this patent is extended or adjusted under 35 U.S.C. 154(b) by 186 days.

(21) Appl. No.: 15/946,079

(22) Filed: Apr. 5, 2018

(65) Prior Publication Data

US 2019/0310947 A1 Oct. 10, 2019

(51) Int. Cl.
| | | |
|---|---|---|
| G06F 12/00 | (2006.01) |
| G06F 13/00 | (2006.01) |
| G06F 13/28 | (2006.01) |
| G06F 12/1009 | (2016.01) |
| G06F 3/06 | (2006.01) |
| G06F 11/10 | (2006.01) |

(52) U.S. Cl.
CPC ........ *G06F 12/1009* (2013.01); *G06F 3/0604* (2013.01); *G06F 3/0647* (2013.01); *G06F 3/0673* (2013.01); *G06F 11/1016* (2013.01); *G06F 2212/1016* (2013.01); *G06F 2212/657* (2013.01)

(58) Field of Classification Search
CPC .................. G06F 11/1016; G06F 12/1009

USPC ....................................................... 711/203
See application file for complete search history.

(56) References Cited

U.S. PATENT DOCUMENTS

| | | |
|---|---|---|
| 7,234,004 B2 | 6/2007 | Raisch |
| 8,185,696 B2 | 5/2012 | Vuletic et al. |
| 9,367,460 B2 | 6/2016 | Klein et al. |
| 9,734,088 B2 | 8/2017 | Klein et al. |
| 9,734,089 B2 | 8/2017 | Klein et al. |
| 10,162,569 B2 | 12/2018 | Pax et al. |

(Continued)

OTHER PUBLICATIONS

Stuedi et al., "Research Report: jVerbs: RDMA support for Java", IBM Research, Jul. 13, 2016, 11 Pages, RZ 3845 Computer Sciences, Zurich, Switzerland.

(Continued)

*Primary Examiner* — Edward J Dudek, Jr.
*Assistant Examiner* — Sidney Li
(74) *Attorney, Agent, or Firm* — Caleb D. Wilkes

(57) ABSTRACT

The invention relates to a method for transferring data between a computer program executed by a processor and an input/output device using a memory accessible by the computer program and the input/output device. An operating system provides a trigger address range in a virtual address space assigned to the computer program. A page fault is caused by accessing the trigger address by the computer program. A page fault handler handling the page fault acquires information for identifying the data to be transferred using the trigger address. The acquired information is provided to the input/output device and the identified data is transferred between the memory and the input/output device.

19 Claims, 11 Drawing Sheets

(56) References Cited

U.S. PATENT DOCUMENTS

| | | | |
|---|---|---|---|
| 2010/0268852 A1* | 10/2010 | Archer | G06F 13/28 |
| | | | 710/22 |
| 2012/0222005 A1* | 8/2012 | Harris | G06F 9/45504 |
| | | | 717/120 |
| 2014/0075060 A1 | 3/2014 | Sharp et al. | |
| 2016/0026392 A1 | 1/2016 | Harris et al. | |
| 2016/0077761 A1* | 3/2016 | Stabrawa | G06F 3/0604 |
| | | | 711/172 |
| 2016/0350002 A1 | 12/2016 | Vergis et al. | |
| 2018/0113614 A1 | 4/2018 | Lee et al. | |

OTHER PUBLICATIONS

Gorman, "Understanding the Linux Virtual Memory Manager", Jul. 9, 2007, pp. 60-81, Bruce Peren's Open Book Series, http://www.Perens.com/books.

Oreilly et al., "Memory Mapping and DMA", Jan. 21, 2005, pp. 412-463, Chapter 15, Bruce Peren's Open Book Series, http://www.Perens.com/books.

* cited by examiner

MEMORY ACCESS BASED I/O OPERATIONS

BACKGROUND

The present disclosure relates to the field of computer systems. More particularly, the present disclosure relates to transferring data between a computer program executed by a processor and an input/output device.

When executing computer programs by a processor of a computer system, typically data has to be provided to the computer program. The provided data is processed resulting in modified and/or additional data generated by the processing. In order to provide data to the processor (input), the computer hardware of a computer system comprises input devices. For receiving data from the processor (output), the computer hardware comprises output devices. Considering modern computer systems, data transfer between computer programs executed by the processor and input/output devices gets more and more time critical. Today, there are highly complex approaches to implement data transfer between computer programs executed by processors and input/output devices. However, the complexity often comes with low efficiency resulting in a rather low transfer speed.

SUMMARY

Various embodiments provide a method for transferring data between a computer program executed by a processor and an input/output device using a memory as well as a computer system and a computer program product for executing the method as described by the subject matter of the independent claims. Advantageous embodiments are described in the dependent claims. Embodiments of the present invention can be freely combined with each other if they are not mutually exclusive.

In one aspect, the invention relates to a method for transferring data between a computer program executed by a processor and an input/output device using a memory. The memory is accessible by the computer program as well as by the input/output device. The memory is managed by an operating system which maps the memory with a virtual address space assigned to the computer program.

The method comprises providing by the operating system an additional trigger address range in the virtual address space. The trigger address range comprises at least one trigger address labeled invalid. Accessing the trigger address by the computer program causes a page fault and triggers the data transfer. The page fault comprises interrupting the execution of the computer program. In response to the page fault, an execution of a page fault handler of the operating system is initiated. The page fault handler is assigned for handling page faults caused by accessing virtual addresses comprised by the trigger address range. Information for identifying the data to be transferred is acquired by the page fault handler using the trigger address. The acquired information is provided to the input/output device. In response to the providing of the acquired information, the identified data is transferred between the memory and the input/output device.

In a further aspect, the invention relates to a computer system computer system comprising a memory, a processor for executing a computer program and an input/output device. The computer system is configured for transferring data between the computer program and the input/output device using a memory. The memory is accessible by the computer program and the input/output device. Furthermore, the memory is managed by an operating system which maps the memory with a virtual address space assigned to the computer program.

The transferring of the data comprises providing by the operating system an additional trigger address range in the virtual address space. The trigger address range comprises at least one trigger address labeled invalid. Accessing the trigger address by the computer system causes a page fault and triggers the data transfer. The page fault comprises interrupting the execution of the computer program. In response to the page fault, an execution of a page fault handler of the operating system is initiated. The page fault handler is assigned for handling page faults caused by accessing virtual addresses comprised by the trigger address range. Information for identifying the data to be transferred is acquired by the page fault handler using the trigger address. The acquired information is provided to the input/output device. In response to the providing of the acquired information, the identified data is transferred between the memory and the input/output device.

In a further aspect, the invention relates to a computer program product. The computer program product comprises a computer-readable storage medium which has machine executable program instructions embodied therewith. The machine executable program instructions are configured to implement a method for transferring data between a computer program executed by a processor and an input/output device using a memory. The memory is accessible by the computer program as well as by the input/output device. The memory is managed by an operating system which maps the memory with a virtual address space assigned to the computer program.

The method comprises providing by the operating system an additional trigger address range in the virtual address space. The trigger address range comprises at least one trigger address labeled invalid. Accessing the trigger address by the computer program causes a page fault and triggers the data transfer. The page fault comprises interrupting the execution of the computer program. In response to the page fault, an execution of a page fault handler of the operating system is initiated. The page fault handler is assigned for handling page faults caused by accessing virtual addresses comprised by the trigger address range. Information for identifying the data to be transferred is acquired by the page fault handler using the trigger address. The acquired information is provided to the input/output device. In response to the providing of the acquired information, the identified data is transferred between the memory and the input/output device.

BRIEF DESCRIPTION OF THE DRAWINGS

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
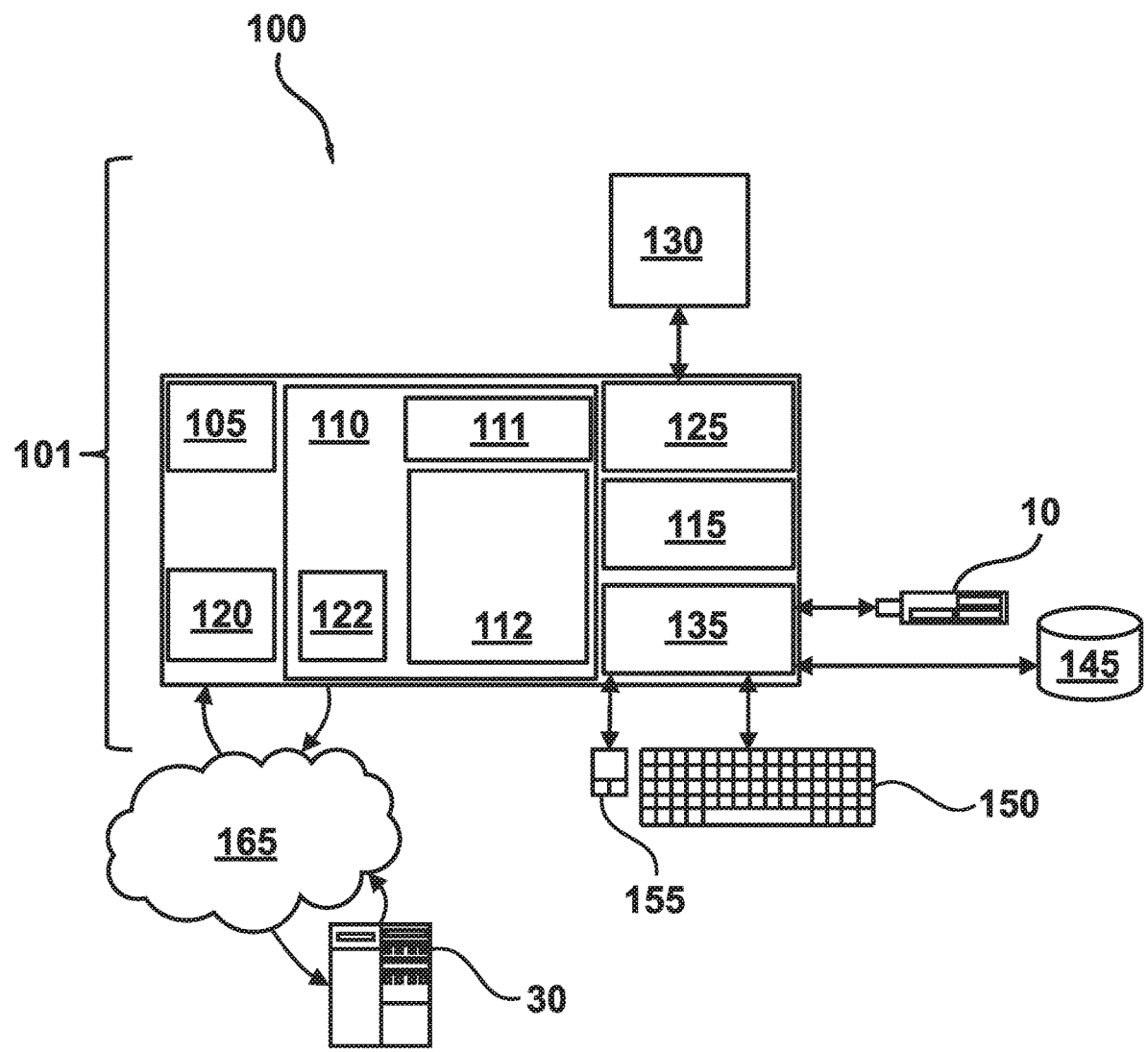
FIG. 1 depicts a schematic diagram of an exemplary computer system, in accordance with an embodiment of the present invention.

The descriptions of the various embodiments of the present invention are being presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments may have the beneficial effect of providing a simple and efficient approach for transferring data between the computer program executed by the processor and the input/output device. The communication is implemented via the memory, which is used for triggering the data transfer and providing metadata defining the transfer to be executed, e.g. identifying the data to be transferred. Furthermore, the memory is used for providing the data to be transferred and/or for receiving the transferred data. Thus, complex communication paths for initiating the data transfer, identifying the data to be transferred as well as transferring the data may be avoided.

For example, for Java Applications executed by a Java virtual machine, usually an access call has to be passed through a C library via a Java native interface and also the complete I/O stack of the kernel of the computer system to finally end up at the input/output device, e.g., using PCIe. This complex communication path may be avoided by providing a trigger address range in the virtual address space of the computer program executed by the processor. The trigger address range provides one or more trigger addresses for causing a page fault when being accessed by the computer program and triggering the data transfer. The page fault is handled by a page fault handler of the kernel which acquires information for identifying the data to be transferred using the trigger address. Thus, a command for transferring data as well as information identifying the data to be transferred between the computer program (e.g., in the form of a Java virtual machine executing a Java application) and the input/output device are provided to the kernel. When the respective data transfer is completed, the page fault handler may instruct the processor to skip any original instruction that may have otherwise been used by the computer program to access the trigger address, (e.g., a write or read instruction for writing to or reading from the trigger address), and to return to the Java virtual machine executing the Java application. This way, the classic initiation approach for initiating data transfers to or from input/output devices may be avoided and the initiation may be performed rather directly with improved latency.

According to embodiments, all the information regarding the data transfer to be executed may be determinable using the trigger address. The trigger address may either itself encode the respective information or identify where the respective information may be found. Thus, the type of data transfer, e.g., input or output, may be independent from the original instruction used by the computer program to access the trigger address and the respective original instruction may be skipped. The data transfer to be executed may, e.g., be a data transfer from the computer program to the input/output device. The data to be transferred may be stored in the memory by the computer program in order to provide the data for the transfer. The instruction used for accessing the trigger address and triggering the data transfer may be any instruction, e.g., a read or a write instruction, since according to embodiments no data may be written to or read from the trigger address. For example, the trigger address may only be used to trigger the data transfer defined by metadata, which, e.g., may be encoded in the trigger address itself or the trigger address may point to the respective metadata. In case the data transfer to be executed is a data transfer from the input/output device to a computer program, accessing the trigger address may trigger a transfer of the data to be transferred from the input/output device to the memory. In order to process the transferred data, the computer program may load (i.e., read) the transferred data from the memory. For this purpose, the page fault handler may initiate execution of a corresponding load instruction by the processor. In case the original instruction used to access the trigger address was such a load instruction (e.g., a read instruction), the page fault handler may initiate a repetition of the load instruction for another virtual address, different from the trigger address, by which the transferred data may be provided by the memory. In case the trigger address additionally maps the memory and the data has been transferred to the memory address mapped by the trigger address, the initial load instruction may be repeated for the same virtual address (i.e., the trigger address).

In general, a page fault is a type of exception in the context of accessing a memory, e.g., by way of a memory page. The exception may be raised by computer hardware when a computer program tries to access a memory page that is not currently mapped into the virtual address space of a process (e.g., by the respective computer program). Logically, the memory page may be accessible but requires a mapping to be the virtual address space and/or may require the actual memory page contents, i.e. data, to be loaded from a backing storage such as a disk. In case the access fails, the processor may detect the page fault. The page fault itself may be handled by a page fault handler, i.e. an exception handling software, which is generally a part of the operating system kernel. When handling a page fault, the operating system may try to make the required memory page accessible at the location in physical memory mapped by the virtual address accessed by the program or terminate the computer program in case of an illegal memory access. Making the required memory page accessible may in general be required to repeat the original access instruction which caused the page fault.

Thus, the page fault handling according to embodiments may differ from known concepts of page fault handling, e.g., the instruction causing the page fault may not be repeated after the page fault has been handled, and the computer program may not be terminated. Instead, the page fault may be used to trigger a data transfer independently of the instruction used for causing the page fault. Furthermore, according to embodiments, the trigger address may not be used for mapping a physical address of the memory at which the data to be transferred may be stored.

According to embodiments, the trigger address may encode metadata identifying the data to be transferred. Embodiments may have the beneficial effect that the trigger address itself may define the data transfer to be executed. For example, a particular trigger address may be reserved for trigger data transfers between the computer program and a particular input/output device. Thus, e.g., each time the respective trigger address is accessed by the computer program, a data transfer between a predefined storage location of the memory and the particular input/output device is executed.

According to embodiments, the trigger address identifies metadata stored in the memory. The stored metadata identifies the data to be transferred. Embodiments may have the beneficial effect of allowing metadata (i.e., that defines the data transfer to be executed) to be provided independently of the length of the trigger address. In case the trigger address is too short and/or the metadata is too long to be encoded in the trigger address itself, providing the metadata via the memory may allow for the use of metadata which cannot be encoded directly in the trigger address itself.

Embodiments may further have the beneficial effect of allowing for different types of data transfers to be triggered by the trigger address, which may be effected depending on the metadata stored in the memory. For example, by amending the metadata, the data to be transferred, the direction of the transfer, and/or the input/output device taking part in the transfer may be changed. Alternatively, by maintaining the metadata, a trigger address for triggering a particular type of data transfer may be maintained.

According to embodiments, the acquired information, which may be used for identifying the data to be transferred, comprises a pointer to the metadata stored in the memory. Furthermore, the input/output device uses the pointer to retrieve the metadata from the memory. Embodiments may have the beneficial effect that the input/output device is enabled to retrieve the metadata defining the data transfer to be executed from the memory. Depending on the details of the data transfer to be executed according to the metadata, the input/output device may transfer the respective data to the memory or retrieve the respective data from the memory.

According to embodiments, the metadata comprises one or more of the following: an identifier of the transfer operation to be executed, an identifier of the origin location of the data to be transferred, an identifier of the target location of the data to be transferred, and an identifier of the size of the data to be transferred. Embodiments may have the beneficial effect of providing all the information for executing the data transfer by the metadata.

According to embodiments, the computer program is a process virtual machine in a platform-independent runtime environment executing an application. Embodiments may have the beneficial effect of implementing an efficient method for transferring data between an executed computer program and an input/output device, even in the case where the computer program is a process virtual machine in a platform-independent runtime environment. The necessary information for executing the data transfer may be provided by the trigger address to the page fault handler and thus to the kernel of the operating system. The memory used for the data transfer is managed by an operating system. Thus, even in case of a platform-independent runtime environment, the information and/or infrastructure necessary for the data transfer is accessible to the kernel and the input/output device independently of the platform-independent runtime environment.

According to embodiments, the process virtual machine is a Java virtual machine in a Java runtime environment. The application is a Java application and the memory is an off-heap memory.

According to embodiments, the data is transferred from the memory to the input/output device. According to embodiments, the data to be transferred is stored in the memory by the computer program. Thus, the respective data is transferred between the computer program and the input/output device via the memory.

According to embodiments, the accessing of the trigger address comprises using a data store instruction. The method further comprises initiating a skipping of the execution of the store instruction by the page fault handler, when continuing the execution of the computer program by the processor. Embodiments may have the beneficial effect that the page fault (i.e., the process intended to execute from the beginning) may be used to trigger the execution of the data transfer. In other words, the page fault handling may not simply enable or prepare the intended process to be executed, but rather executes the respective process itself. Thus, an associated instruction, (e.g., a store instruction used when accessing the trigger address) may be skipped, since the intended process may have already been completed or may be completed asynchronously without further involving the computer program.

According to embodiments, the memory is accessible by firmware of the input/output device. The transferring of the identified data comprises retrieving the identified data from the memory by the firmware which provides the retrieved data to hardware of the input/output device. Embodiments may have the beneficial effect of providing an efficient approach for transferring data from the memory to the input/output device. For example, in case the data to be transferred is short enough and the firmware is enabled to buffer the complete data to be transferred, this embodiment may provide efficient data retrieval on the firmware level.

According to embodiments, the memory is accessible by the hardware of the input/output device. The transferring of the identified data comprises retrieving the identified data from the memory by the hardware. Embodiments may have the beneficial effect of providing an efficient data retrieval on the hardware level independently of restrictions arising from the size of the data to be transferred and/or the buffering capacities available to the firmware. According to embodiments, a translation of a virtual address of the identified data to be transferred to a physical address is registered and provided to the hardware of the input/output device by the page fault handler in order to enable the hardware to address the respective data.

According to embodiments, the retrieving of the identified data by the hardware of the input/output device is completed asynchronously, while the execution of the computer program by the processor is continued. Embodiments may have the beneficial effect of enabling a continuation of the execution of the computer program after the data transfer has been started. Thus, it may not be necessary to wait until the transfer is completed. This may in particular be beneficial in case larger amounts of data are to be transferred. As soon as the transfer of the data from the memory to the input/output device is started, it may be completed by the hardware of the input/output device without requiring any further involvement of the computer program, and/or restriction of execution by the computer program.

According to embodiments, the data to be transferred is pinned in the memory in response to the initiation of the execution of the page fault handler. The pinning prevents the data to be transferred from being swapped out of the memory for being stored in an additional computer storage. Embodiments may have the beneficial effect of ensuring, in the case of large amounts of data to be transferred, that the data to be transferred is available in the memory until the transfer is completed. The pinning may be executed on demand when a data transfer is triggered. After the data transfer is completed, the pinned data may be unpinned by the page fault handler in order to enable a swapping out of the respective data from the memory for being stored in an additional computer storage (e.g., a disk storage). Alternatively, the pinning may be executed in advance (i.e., ahead of time). According to embodiments, a pinned transfer section, which is comprised by the memory, is provided for storing the data to be transferred. The pinning of the transfer section prevents data comprised by the transfer section from being swapped out of the memory for being stored in the additional computer storage. The transfer section may be unpinned after a plurality of different data transfers between the computer program and one or more input/output devices have been executed. For example, the transfer section may be unpinned when the execution of the computer program is terminated.

According to embodiments, the data is transferred from the input/output device to the memory. According to embodiments, the data to be transferred is provided by the input/output device using a read ahead process based on a previous data transfer from the input/output device to the memory. Embodiments may have the beneficial effect of accelerating the data transfer, when the data to be transferred already has been transferred to the memory e.g. in the course of a previous data transfer. By reading ahead data may be prefetched such that, when it is subsequently accessed, the prefetched data may be read from the memory directly without requiring an additional transfer from the input/output device, resulting in a lower access latency.

According to embodiments, the accessing of the trigger address comprises using a data load instruction. The method further comprises initiating a repetition of the execution of the load instruction by the page fault handler when continuing the execution of the computer program by the processor. According to embodiments, the repeated load instruction may be modified to load the transferred data from the memory, e.g., by accessing the virtual address(es) under which the respective data is stored in the memory. In case of a data transfer from the input/output device to the memory, the respective data may be loaded by the computer program in order to process the same. Embodiments may have the beneficial effect of (re)using the data load instruction for providing the transferred data to the computer program. Alternatively, an execution of a load instruction may be initiated which is independent of the instruction used for accessing the trigger address. The independent load instruction may be, e.g., adapted to the individual data transfer using the metadata.

According to embodiments, the computer system is configured to execute any of the embodiments of the method for transferring data between the computer program executed by the processor and the input/output device using the memory as descript herein.

FIG. 1 depicts a computer system 100 suited for implementing a method for transferring data between a computer program executed by processor 105 and one or more input/output devices of the computer system 100, e.g., one or more of input/output devices: 10, 130, 145, 150, and/or 155, as shown in FIG. 1. It will be appreciated that the methods described herein are at least partly non-interactive, and automated by way of computerized systems, such as servers or embedded systems. In exemplary embodiments, the methods described herein may be implemented in a (partly) interactive system. These methods may further be implemented in software 112, 122 (including firmware 122), hardware (processor) 105, or a combination thereof. In exemplary embodiments, the methods described herein are implemented in software, as an executable program, and are executed by a special or general-purpose digital computer, such as a personal computer, workstation, minicomputer, or mainframe computer. The most general computer system 100 therefore includes a computer such as a general-purpose computer 101.

In exemplary embodiments, in terms of hardware architecture, as shown in FIG. 1, the computer 101 includes a processor 105, memory (main memory) 110 coupled to a memory controller 115, and one or more input and/or output (I/O) devices (or peripherals) 10, 145 that are communicatively coupled via a local input/output controller 135. The input/output controller 135 may be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The I/O devices 10, 145 may comprise, e.g., any portable storage device 10 or stationary storage device 145.

The processor 105 is a hardware device for executing software, particularly that stored in memory 110. The processor 105 may be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 may include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM)). Note that the memory 110 may have a distributed architecture, where various components are situated remote from one another, but may be accessed by the processor 105.

The software in memory 110 may include one or more separate programs, each of which comprises an ordered listing of executable instructions for implementing logical functions, notably functions involved in embodiments of the invention. In the example of FIG. 1, software in the memory 110 includes instructions or software 112.

The software in memory 110 may also include a suitable operating system (OS) 111. The OS 111 essentially controls the execution of other computer programs, such as possibly software 112 for implementing methods as described herein.

The methods described herein may be in the form of a source program 112, executable program 112 (object code), script, or any other entity comprising a set of instructions 112 to be performed. When being provided as a source program, then the respective program needs to be translated via a compiler, assembler, interpreter, or the like, which may or may not be included within the memory 110, so as to operate properly in connection with the OS 111. Furthermore, the methods may be written as an object-oriented programming language, which has classes of data and methods, or a procedure programming language, which has routines, subroutines, and/or functions.

According to embodiments, the software 112 may comprise a process virtual machine for execution in a platform-independent runtime environment. Software 112 may furthermore comprise applications, i.e. user applications, to be executed by the process virtual machine. For example, the process virtual machine may be a Java virtual machine to be executed in a Java runtime environment and the application may be a Java application. The memory 110 may further comprise an off-heap memory.

In exemplary embodiments, a conventional keyboard 150 and mouse 155 may also be coupled to the input/output controller 135. Other output devices such as the I/O devices 145 may include input devices, for example but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 145 may be any generalized cryptographic card or smart card known in the art. The system 100 may further include a display controller 125 coupled to a display 130. In exemplary embodiments, the system 100 may further include a network interface for coupling to a network 165. The network 165 may be an IP-based network for communication between the computer 101 and any external server, client and the like via a broadband connection. The network 165 transmits and receives data between the computer 101 and external systems 30. In exemplary embodiments, network 165 may be a managed IP network administered by a service provider. The network 165 may be implemented in a wireless fashion, e.g., using wireless protocols and technologies, such as WiFi, WiMax, etc. The network 165 may also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) 122. The BIOS is a set of essential software routines that initialize and test hardware at startup, start the OS 111, and support the transfer of data among the hardware devices. The BIOS is stored in ROM so that the BIOS may be executed when the computer 101 is activated.

When the computer 101 is in operation, the processor 105 is configured to execute software 112 stored within the memory 110, to communicate data to and from the memory 110, and to generally control operations of the computer 101 pursuant to the software. The methods described herein and the OS 111, in whole or in part, but typically the latter, are read by the processor 105, possibly buffered within the processor 105, and then executed.

When the systems and methods described herein are implemented in software 112, as is shown in FIG. 1, the methods may be stored on any computer readable medium, such as storage 120, for use by or in connection with any computer related system or method. The storage 120 may comprise a disk storage such as HDD storage.

Figure 2:
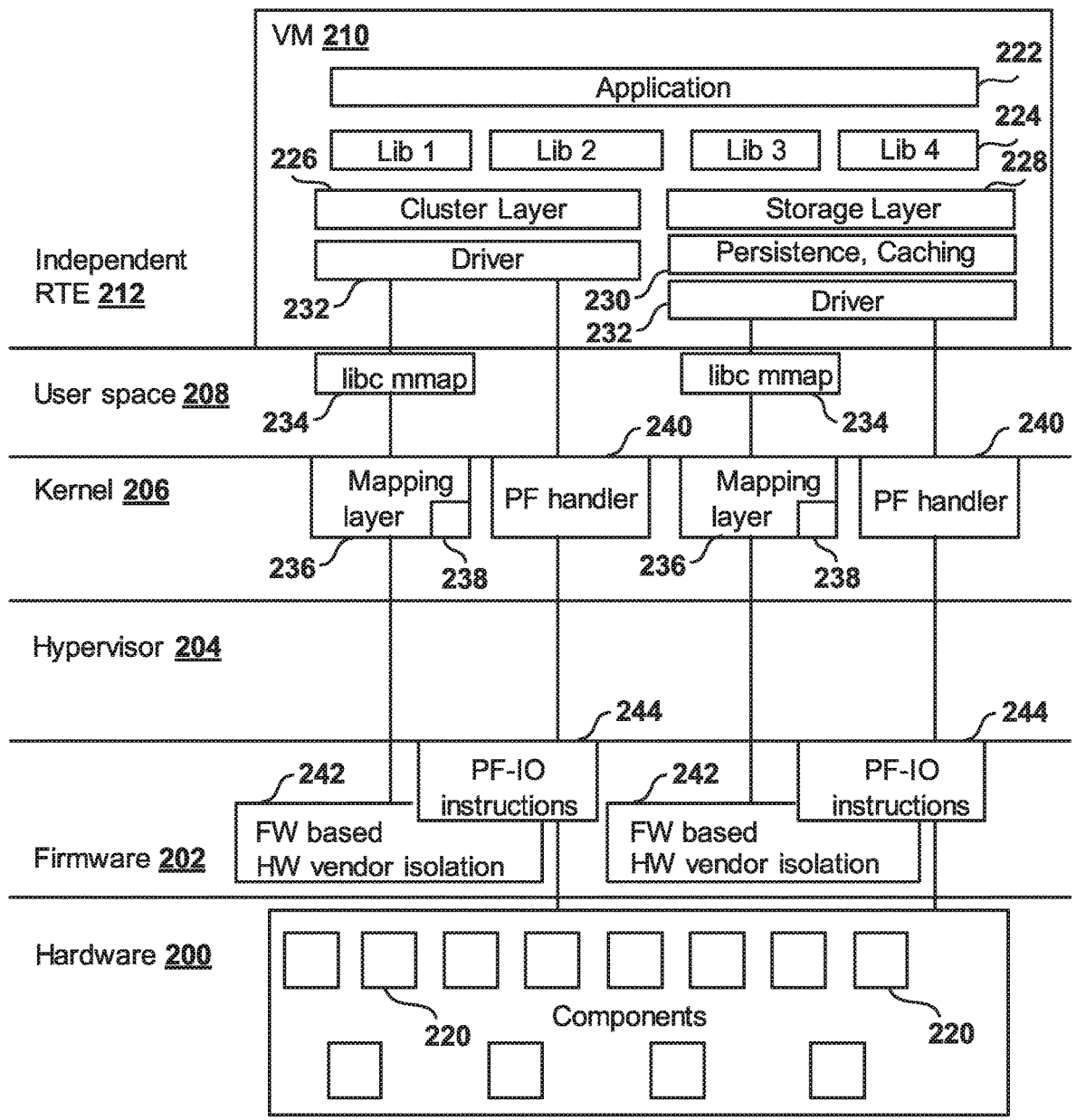
FIG. 2 depicts a schematic diagram of an exemplary infrastructure, in accordance with an embodiment of the present invention.

FIG. 2 illustrates an infrastructure for implementing embodiments. The infrastructure may be provided by a computer system, e.g., the computer system 100 of FIG. 1, and/or may be part of a computer cluster. The infrastructure may comprise a plurality of hardware 200 components, e.g., one or more I/O devices 220. According to embodiments, these I/O devices 220 may be provided by a computer cluster. The infrastructure may further comprise firmware 202 controlling the hardware 200 components. The infrastructure may comprise a hypervisor 204 providing a virtual operating platform for a kernel 206 of a guest operating system and managing execution of the guest operating system. Furthermore, the infrastructure may comprise a user space 208 for executing user programs. According to embodiments, the executed computer program may be a process virtual machine 210, e.g., a Java virtual machine, which may be executed in a platform independent run time environment 212. The Java virtual machine 210 may for example execute an application 222, e.g., a Java application. The process virtual machine may have a plurality of libraries and tools 224, e.g., SQL, streaming, MLlib, GraphX, etc. Furthermore, for implementing a cluster-computing framework, the Java virtual machine 210 may provide a cluster layer, e.g., a spark cluster layer 226, for managing the computer cluster and a storage layer 228, e.g., a spark storage layer, thereby providing means 230 for storing data persistently as well as for caching data in the cluster. In addition, the Java virtual machine 210 may provide drivers 232, e.g., single root I/O virtualization drivers. In the user space there may be provided libraries 234 for memory mapped I/O, e.g., libc mmap. The kernel 206 may provide a mapping layer, e.g., for mapping the memory with a virtual address space assigned to the virtual machine 210. The mapping layer 236 may implement an additional trigger address range 238 in the virtual address space, for causing a page fault when being accessed and triggering a data transfer. The firmware 202 may, e.g., implement a firmware-based hardware vendor isolation 242. In case a trigger address provided by the trigger address range 238 is accessed, a page fault may occur, which may be handled by a page fault handler 240 of the kernel 206. The page fault handler 240 acquires and forwards information defining the data transfer to be executed, e.g., information identifying the data to be transferred, to the firmware 202. The firmware 202 may comprise page fault I/O instruction 244 for executing an I/O (input/output) operation triggered by a page fault caused by accessing a trigger address of the trigger address range 238. Here, the page fault handler 240 is enabled to initiate a data transfer between any of the input/output devices 220 comprised by the hardware and the virtual machine 210.

Figure 3:
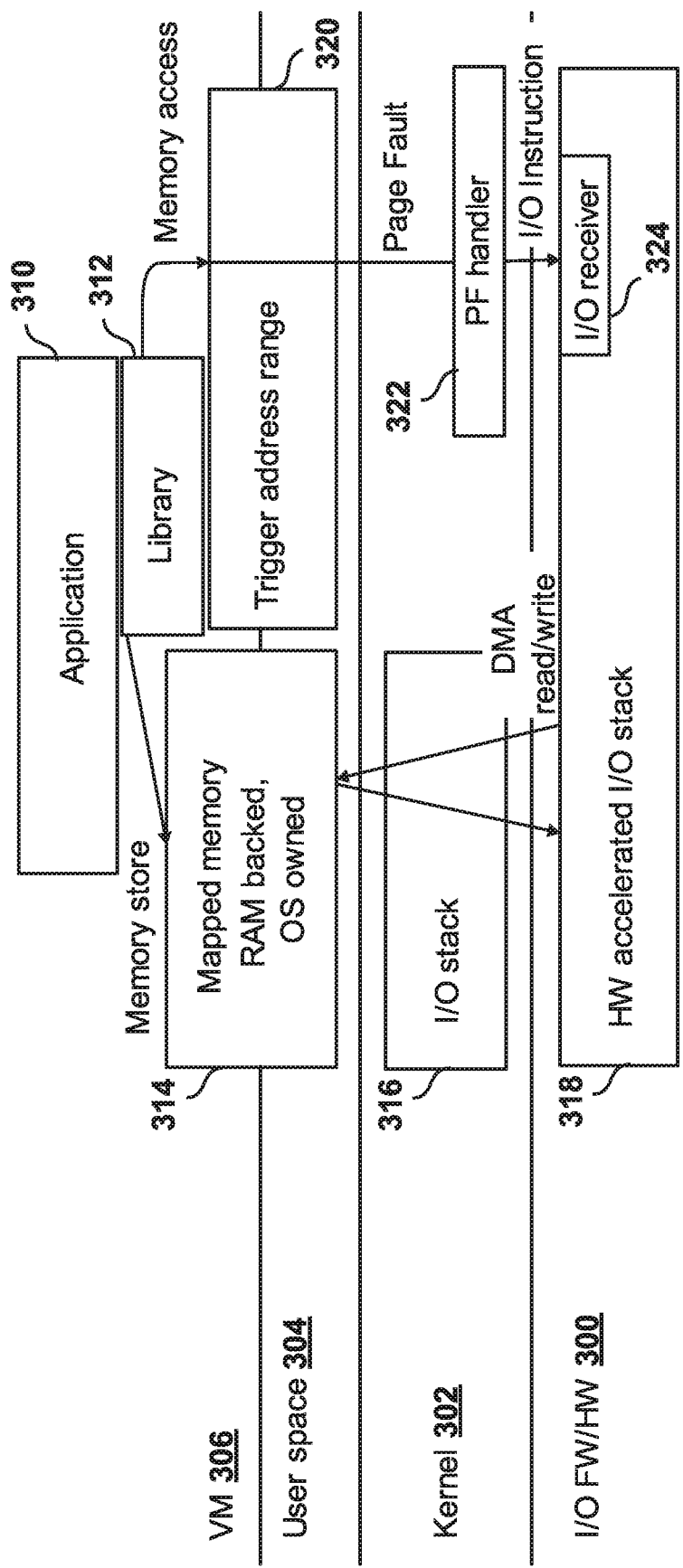
FIG. 3 depicts a schematic diagram of an exemplary infrastructure, in accordance with an embodiment of the present invention.

FIG. 3 shows a further exemplary infrastructure for implementing embodiments. The infrastructure comprises a virtual machine 306, e.g., a Java virtual machine, a user space 304, a kernel 302, and an input/output device 300 comprising I/O firmware as well as hardware. The virtual machine 306 may execute an application 310, e.g., a Java application. The application 310 may use a library 312, e.g., a Java library, which may provide executable code for execution by a Java virtual machine. The library 312 may provide resources to be used by the application 310, e.g., configuration data, message templates, pre-written code and subroutines, classes, values, or type specifications. When being called during execution of the application 310, the library 312 may provide executable code for storing user data in a memory managed by the kernel 302 and accessible by the application 310, e.g., using the library 312, as well as the input/output device 300. The library 312 may provide, e.g., executable code for executing the respective memory store process. The memory may be, e.g., an off-heap memory. The memory is mapped to a virtual address space assigned to virtual machine. Thus, a range 314 of the virtual address space may be mapped to RAM-backed memory, which may be owned by the operating system. The range 314 of the virtual address space mapping the memory may be used for storing data in the memory, e.g., for writing data into the memory, and for retrieving data stored in the memory, e.g., for reading data from the memory. Furthermore, the virtual address space may comprise a trigger area 320 with one or more trigger addresses for causing a page fault and triggering a data transfer between the memory mapped by the virtual address space 314 and the input/output device 300.

In order to store data in the memory, i.e., in order to provide user data to be transferred to the input/output device 300, to read user data transferred from the input/output device 300 to the memory, or to provide metadata defining a data transfer to be executed between the memory and the input/output device 300, the application may access a virtual address comprised by the range 314 of the virtual address space using a memory store instruction. The virtual addresses comprised by the range 314 may also be provided to the input/output device 300. The input/output device 300 may, e.g., use a hardware accelerated I/O stack 318 to transfer data to the memory, and/or to retrieve data from the memory mapped by range 314 of the virtual address space. The data transfer may be executed via the I/O stack 316 of the kernel 302 using direct memory access (DMA) write and/or read operations. Using DMA may enable the I/O device 300 to access the memory, e.g., RAM, independent of the central processing unit (CPU), i.e., the processor. Thus, with DMA the processor may, e.g., initiate the data transfer and then execute other operations while the transfer is in progress. When the data transfer operation using DMA is completed, the processor may receive a confirmation.

In order to trigger a transfer of user data stored in the memory to the input/output device 300 or from the input/output device 300 to the memory, a trigger address comprised by the trigger address range 320 of the virtual address space may be accessed by the application 310, e.g., using the library 312. From the point of view of the application 310, accessing the trigger address (which is comprised by the virtual address space) may appear like a typical memory access, e.g., a write or read access. Accessing the trigger address causes a page fault and initiates an execution of page fault handler 322 assigned to trigger address range 320. The page fault handler 322 may initiate a data transfer between the memory and the input/output device 300 depending on metadata defining the transfer to be executed. The respective metadata may for example be encoded in the trigger address that is accessed. According to embodiments, the type of data transfer, i.e., from the memory to the input/output device 300 or vice versa, may depend on the type of access to the trigger address, e.g., write and/or read, respectively. According to embodiments, an identifier, e.g., a pointer, may be encoded in the trigger address that may be accessed. The identifier identifies a metadata stored in the memory which identifies the data transfer to be executed. The respective metadata may have been stored in the memory by application 310 earlier, using the range 314 of the virtual address space which maps the memory. The page fault handler 322 calls an I/O receiver 324 of the input/output device 300 using I/O instructions based on the metadata. The I/O receiver may execute the data transfer retrieving data from the memory or transferring data to the memory depending on the I/O instructions used by the page fault handler 322.

For example, library 312, e.g., a Java library, triggers PF handler 322 by accessing the trigger address using a memory store command. The trigger address may comprise a data value which points to a control block stored in the memory, e.g., off-heap memory, containing parameters of a system call for executing the data transfer. By the system call control may be transferred from user space 304 to kernel space 302 and requesting a service from the kernel 302 of the operating system to be executed. The service may comprise executing the page fault handler 322 and initiating the data transfer. The I/O receiver 324 called by the page fault handler 322 may retrieve user data to be transferred to the I/O device 300 from the off-heap memory into a local hardware buffer, e.g., a hardware stack local buffer. The I/O receiver returns to the page fault handler which instructs the processing unit to skip the instruction causing the page fault, i.e., the access instruction for accessing the trigger address. The execution returns to the page fault handler 322. The fault handler 322 may instruct the processor to skip the instruction which triggered the execution of the page fault handler 322, i.e., the memory store command. Finally, the Java application 310 may continue its operation using the Java library 312. Meanwhile, the hardware I/O stack may use a PCIe store to indicate and complete the transfer of the user data from the off-heap memory to the I/O device 300. The later process may be executed as an asynchronous process, i.e., independently of the further execution of the Java application 310.

Figure 4:
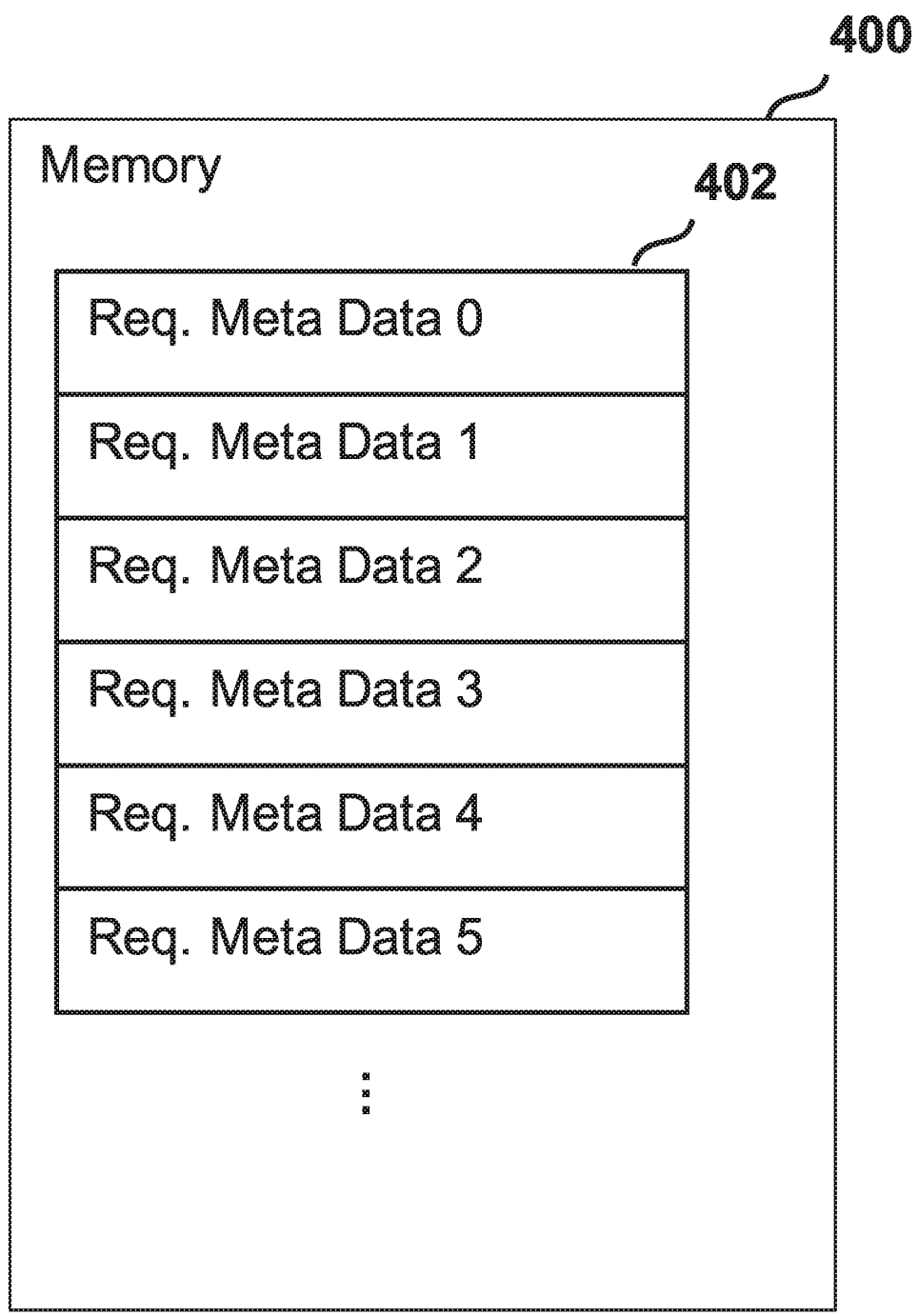
FIG. 4 depicts a schematic diagram of an exemplary memory, in accordance with an embodiment of the present invention.

FIG. 4 depicts a schematic diagram of an exemplary memory 400. The memory 400 may comprise an array with a plurality of request metadata entries 402. The request metadata entries 402 may comprise a command, e.g., a write command, an addressing command, e.g., a logical block addressing (LBA) command, a list of pointers to data to be transferred, e.g., a scatter/gather list, and/or device specific data. The size of array 402 may, e.g., be fixed per device type or communicated during a setup. The program code may register with the kernel and provide a pointer to and/or the size of the metadata array 402. The kernel may reserve an address range, i.e., a trigger range, in the virtual address space of the program and provide the program with information indicating the base address of the range. An offset into this range may be used as an index into the metadata array 402. The kernel may setup an address translation for the address range with invalidated page table entries, assign a specific page fault handler to this address range, and associate the address range with a specific device. The program code may select a slot of the metadata array 402 and add metadata assuming that data to be transferred has already been stored in the memory. The program may write into the address range provided by kernel during setup with an offset which corresponds to an array index resulting in case of a page fault. The address range specific page fault handler may be invoked in case of a page fault due to accessing a trigger address comprised by the address range. The page fault handler may derive a pointer to the metadata array 402 entry from the address communicated during setup and an index from an offset into the address range. Further, the page fault handler may trigger an I/O receiver with pointer to the metadata entry in order to trigger the actual I/O operation. The I/O receiver may fetch the metadata array and then transfer data pointed to by metadata into an internal buffer. The data transfer may occur asynchronously. The I/O receiver may return to the page fault handler, the page fault handler may skip the write instruction that caused the page fault, and the program may continue its operation.

Figure 5:
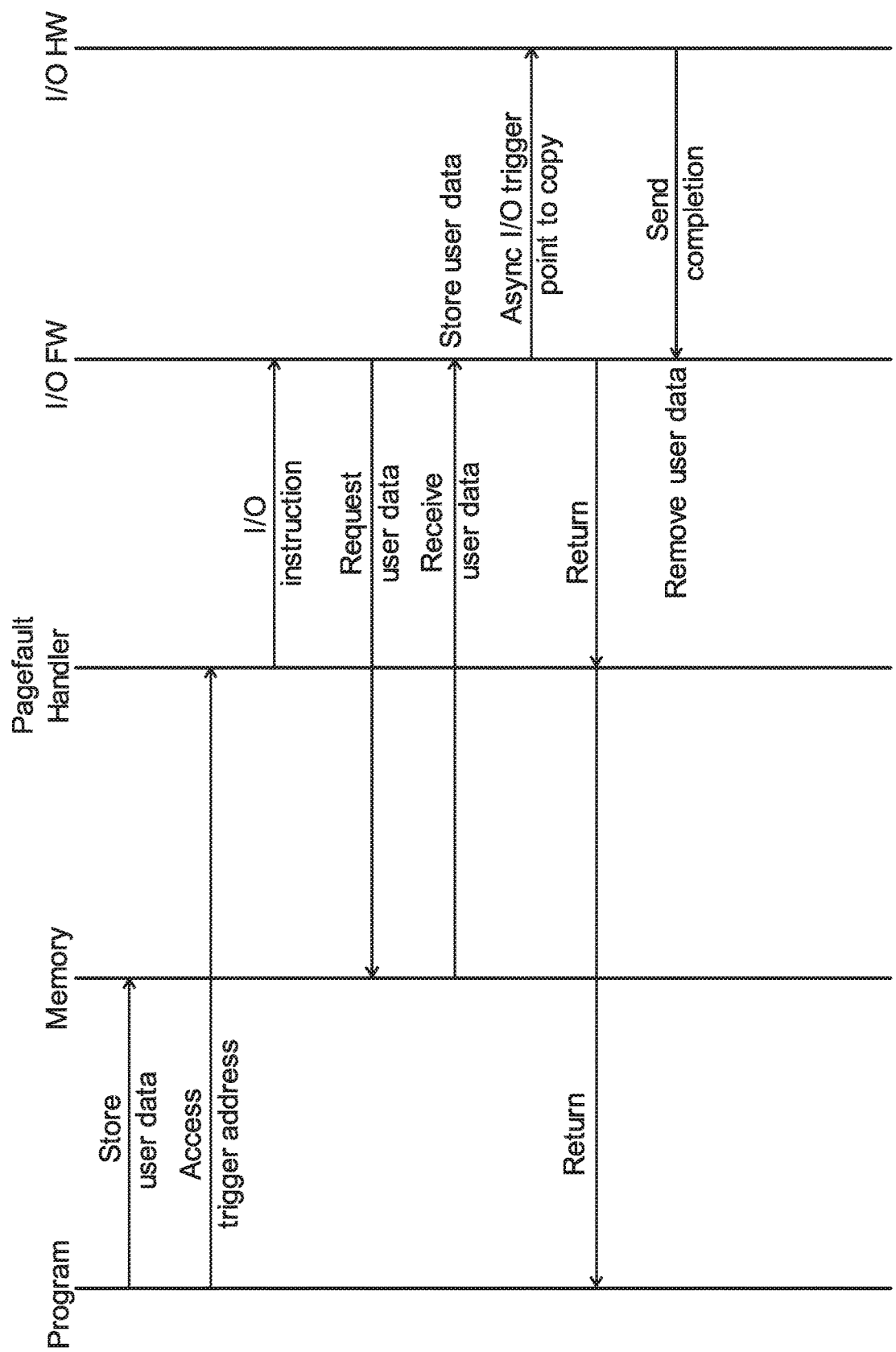
FIG. 5 depicts a schematic flow diagram of an exemplary data transfer to the I/O device, in accordance with an embodiment of the present invention.

FIG. 5 provides an exemplary flow diagram illustrating a write operation executed by a program, e.g., a Java virtual machine executing a Java application. The program stores user data in the memory, e.g., a mapped byte buffer of the off-heap memory. A mapped byte buffer is a direct byte buffer whose content is a memory-mapped region of a file. The program accesses a trigger address comprised by a trigger area of a virtual address space assigned to the program. The accessing of the trigger address causes a page fault and triggers the page fault handler. The page fault handler sends an I/O instruction to the I/O firmware of an I/O device. Upon receipt of the I/O instruction, the I/O firmware retrieves the previously stored user data from the memory. A request for the user data may be sent to the memory and the requested user data may be received. The retrieved user data is locally stored by the I/O firmware, e.g., in a local buffer assigned to the firmware. An asynchronous I/O trigger pointing to the locally stored user data stored by the firmware may be provided by the firmware to the I/O hardware. Meanwhile, the execution returns from the I/O firmware via the page fault handler to the program, e.g., the Java virtual machine, which continues to execute the Java application. The I/O hardware asynchronously retrieves the user data buffered by the I/O firmware. Upon completion of the retrieval, the I/O hardware sends a confirmation of completion to the I/O firmware. Upon receipt of the respective confirmation, the I/O firmware removes the user data from the local buffer.

Figure 6:
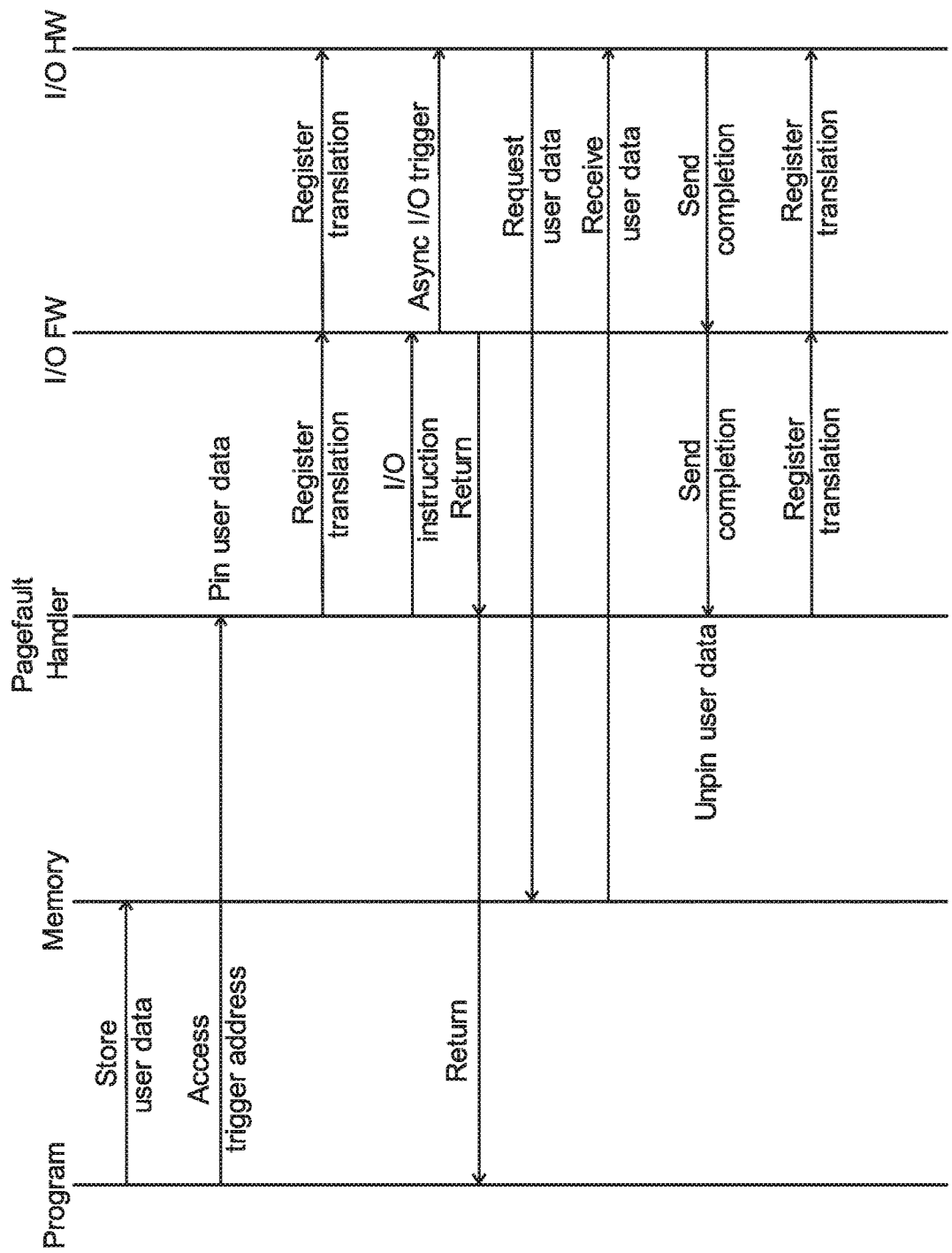
FIG. 6 depicts a schematic flow diagram of an exemplary data transfer to the I/O device, in accordance with an embodiment of the present invention.

FIG. 6 shows a further exemplary flow diagram of executing a write operation. The method shown in FIG. 5 may, e.g., be beneficial for user data comprising a small amount of data, i.e., an amount of data for which it may be safely assumed that the respective user data, when stored in memory using, e.g., a mapped memory buffer, is not swapped out to the main memory while executing the I/O process. The following method illustrated in FIG. 6 may be beneficial for user data which comprises a larger amount of data. The program stores user data in the memory. By accessing the trigger address, a page fault is caused and execution of the page fault handler assigned to the respective trigger address is initiated. The page fault handler pins the user data stored in the memory, e.g., in the mapped byte buffer, in order to prevent the respective user data from being swapped out to the main memory. Here, the data pinning is executed on demand in response to the triggering of the data transfer. Furthermore, the page fault handler may initiate a registration of a translation of the virtual address of the user data to an address usable by the hardware of the I/O device. The translation may be registered by the I/O firmware and forwarded to the I/O hardware. Thus, the I/O hardware is enabled to address the pinned user data in the memory. The page fault handler sends an I/O instruction to the I/O firmware. In response to receiving the I/O instruction, the I/O firmware sends a trigger for triggering an asynchronous I/O operation to the hardware. The execution returns from the I/O firmware via the page fault handler to the program and the execution of the program is continued. For example, the program in form of a Java virtual machine continues executing a Java application. Meanwhile, the I/O hardware asynchronously executes the data transfer from the memory to the I/O device which has been triggered by the asynchronous I/O trigger received from the I/O firmware. In contrast to the method illustrated in FIG. 5, the method illustrated in FIG. 6 does not locally buffer the user data by the I/O firmware. The I/O hardware, rather than the I/O firmware, requests and receives the user data from the memory. Since the user data is pinned, it may be assured that the respective data is available until completion of the transfer to the I/O hardware. When the data transfer is completed, a confirmation of the completion of the transfer is sent by the I/O hardware to the I/O firmware. The I/O firmware forwards the confirmation of the completion to the page fault handler which unpins the user data in response to receiving the confirmation of completion. Furthermore, the page fault handler initiates an unregistering of the translation of the address of the user data. In order to unregister the translation, the page fault handler sends a respective instruction to the I/O firmware, which forwards the unregistering instruction to the I/O hardware.

Figure 7:
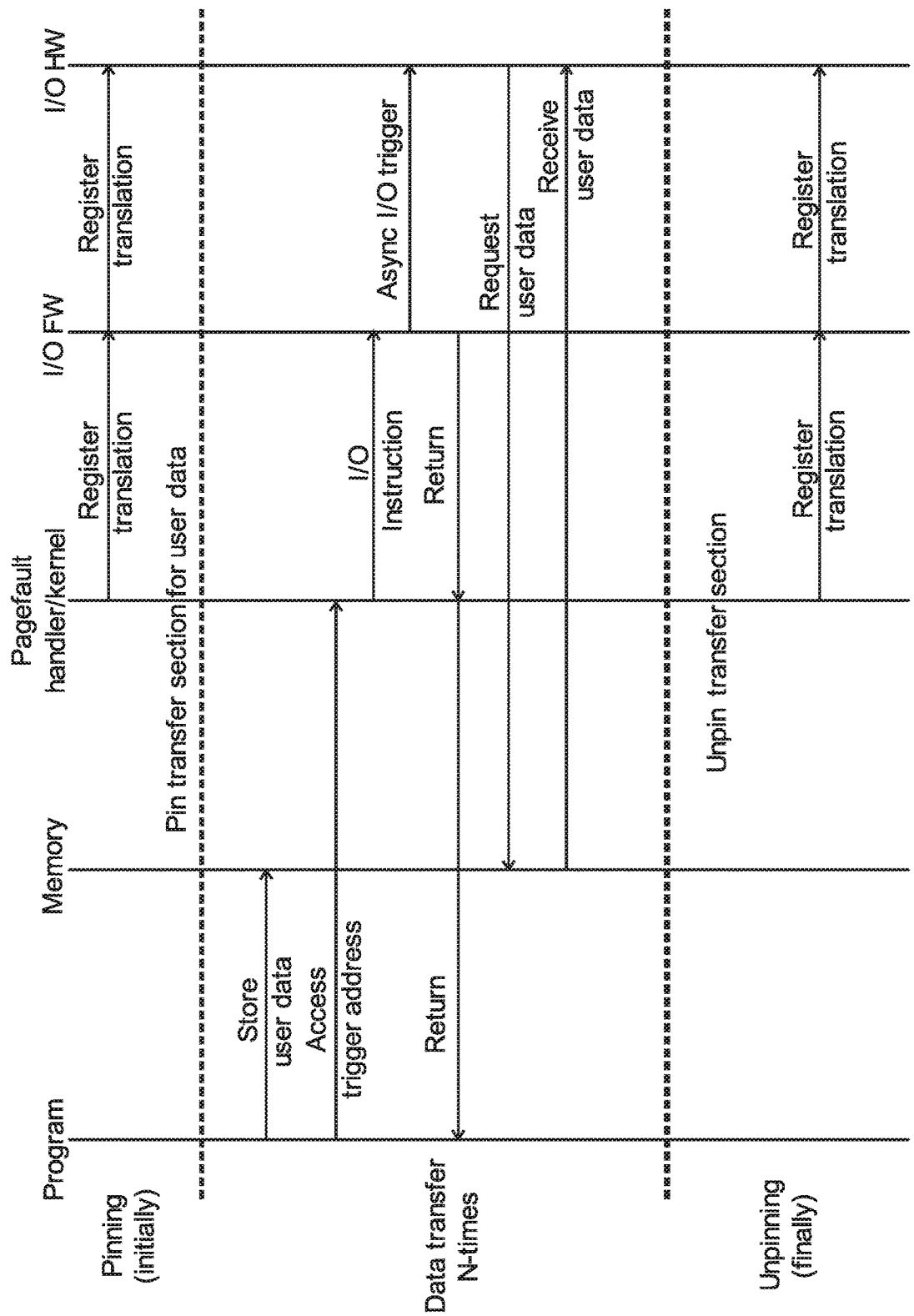
FIG. 7 depicts a schematic flow diagram of an exemplary data transfer to the I/O device, in accordance with an embodiment of the present invention.

FIG. 7 shows a further exemplary flow diagram of a method for executing a write operation. In contrast to the method shown in FIG. 6, the method of FIG. 7 implements a pinning ahead of time for one or more data transfers rather than individually pinning and unpinning the user data for each single data transfer on demand. In other words, the page fault handler reserves ahead of time an area of the off-heap memory which is pinned, i.e., that from which no data is swapped out to the main memory. A transfer section comprised by the memory is provided for storing user data to be transferred an I/O device. The transfer section may be a continuous section of a distributed section comprising a plurality of distributed subsections. The transfer section is mapped by transfer range of the virtual address space assigned to the program. The transfer range may comprise one or more virtual address for storing user data to be transferred. An initial pinning process may be executed by the kernel, e.g., using the page fault handler or program routine of the kernel. The initial pinning process may, e.g., be executed when the execution of the program is initiated. The pinning process may comprise initiating a registration of translation of the virtual addresses of the transfer range by the page fault handler in order to provide addresses usable by the I/O hardware. The translation may be registered by the I/O firmware as well as the I/O hardware. Furthermore, the kernel pins the transfer section. Thus, a section of the memory is reserved for storing user data to be transferred. Due to the pinning, the user data stored transfer section is prevented from being swapped out of the memory, e.g., for being stored in the additional computer storage.

After execution of the initial pinning process, one or more data transfers may be executed. For example, N data transfers of different sets of user data from the memory to the I/O hardware of the I/O device may be executed. In other words, the steps shown between the two dashed lines in FIG. 7 may be constituted by an individual data transfer from the memory to the I/O device. Thus, in case of N data transfers, the steps between the dashed lines may be executed N times. The program stores user data to transferred in the transfer section of the memory using the virtual address comprised by the transfer range of the virtual address space assigned to the program. Furthermore, the program accesses a trigger address comprised by the trigger range of the virtual address space. By accessing the trigger address, a page fault is caused and execution of the page fault handler assigned to the respective trigger address is initiated. The page fault handler sends an I/O instruction to the I/O firmware. In response to receiving the I/O instruction, the I/O firmware sends a trigger for triggering an asynchronous I/O operation to the hardware. The execution returns from the I/O firmware via the page fault handler to the program and the execution of the program is continued. For example, the program (e.g., in the form of a Java virtual machine) continues executing a Java application. Meanwhile, the I/O hardware asynchronously executes the data transfer from the memory to the I/O device which has been triggered by the asynchronous I/O trigger received from the I/O firmware. The I/O hardware requests and receives the user data from the transfer section of the memory. Since all the user data comprised by the transfer section of the memory is pinned, it may be assured that the respective data is available until completion of the transfer to the I/O hardware. When the data transfer is completed, a confirmation of the completion of the transfer is send by the I/O hardware to the I/O firmware. The I/O firmware forwards the confirmation of the completion to the page fault handler which unpins the user data in response to receiving the confirmation of completion.

Finally, an unpinning process is executed. This final unpinning process may, e.g., be executed when the execution of the program to which the virtual address space is assigned is terminated. The transfer section of the memory reserved for storing user data to be transferred is unpinned by the kernel. Furthermore, the kernel initiates an unregistering of the translations of the virtual addresses of the transfer range of the virtual user space. In order to unregister the translation, the kernel may send a respective instruction to the I/O firmware, which may forward the unregistering instruction to the I/O hardware.

Figure 8:
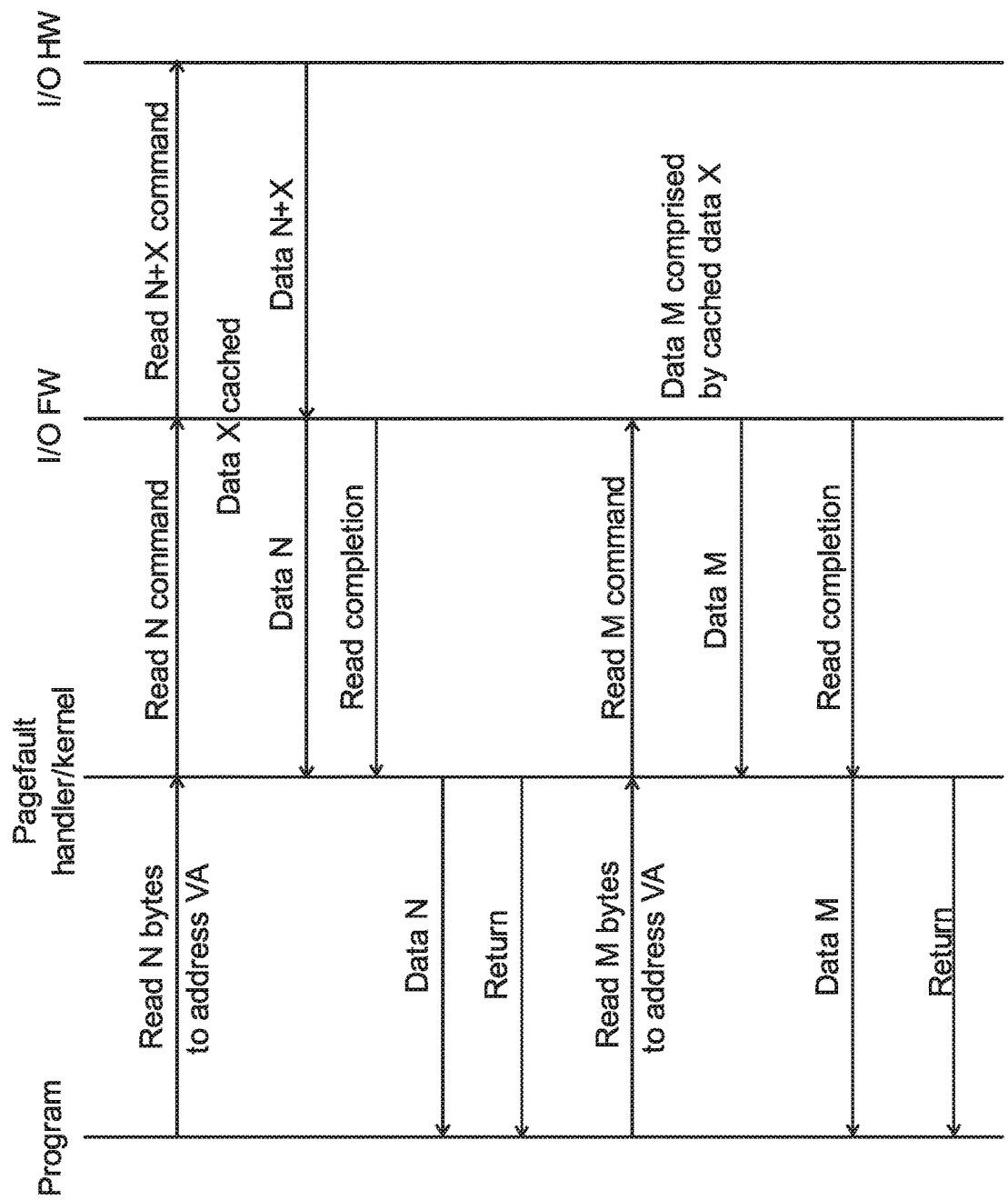
FIG. 8 depicts a schematic flow diagram of an exemplary data transfer from the I/O device, in accordance with an embodiment of the present invention.

FIG. 8 shows an exemplary flow diagram of a read action in order to read data from an I/O device. A program, e.g., a Java virtual machine executing a Java application, signals to a kernel of the operating system that N bytes are to be read from an I/O device to the memory, i.e., to an address or to a range of addresses of the virtual address space mapping the memory. Such a read command may be provided using a trigger address comprised by the virtual address space. The trigger command, e.g., a read command used to access the trigger address, and/or the trigger address may define the read operation to be executed. In other words, the trigger command and/or the trigger address may comprise a read command to read N bytes of data to the memory. The kernel, i.e., a page fault handler handling the page fault caused by the accessing of the trigger address, sends an I/O instruction to the I/O firmware. The I/O instruction may comprise a command to read the N bytes of data to the memory. The I/O firmware may be configured to execute a read ahead. In this case, the I/O firmware does not simply forward the command to read the N bytes to the I/O hardware, but rather sends a command to the I/O hardware to read N+X bytes, i.e., to read additional X bytes. In response to the command to read the N+X bytes, the requested N+X bytes are sent to the I/O firmware by the I/O hardware. The I/O firmware forwards the requested N bytes of data to the kernel, while the additional X bytes read ahead is cached by the I/O firmware. Thus, the additional X bytes are available by the firmware for additional read requests from the program or, in case of a set up with multiple operating systems reading the same data (e.g., in case of a Linux kernel) for requests from another operating system. For example, the firmware may in addition cache the N bytes of data. When the transfer of the N bytes of data from the I/O firmware to the kernel is completed, a confirmation of the completion may be sent by the I/O firmware to the kernel. The kernel may forward the requested N bytes to the program and the execution may return from the kernel to the program.

In case the program needs to read additional data, a read of additional M data to the memory may be triggered by the program. Analogous to the read operation for reading the N bytes before, the program may access a trigger address to trigger a reading of the additional M bytes of data. By accessing the trigger address, a page fault is caused and the execution of the page fault handler initiated. As before, the kernel sends a read command for reading the data requested by the program, i.e. the M bytes, to the I/O firmware. The I/O firmware checks whether the requested M bytes are already available in a local cache of the I/O firmware. In case the M bytes are comprised by the X bytes read ahead before, the I/O firmware may read the respective M data from the local cache and send the data to the kernel, without involving the I/O hardware. When the transfer of the M bytes of data from the I/O firmware to the kernel is completed, a confirmation of the completion may be sent by the I/O firmware to the kernel. The kernel may forward the M bytes to the application and the execution returns to the execution of the program.

Figure 9:
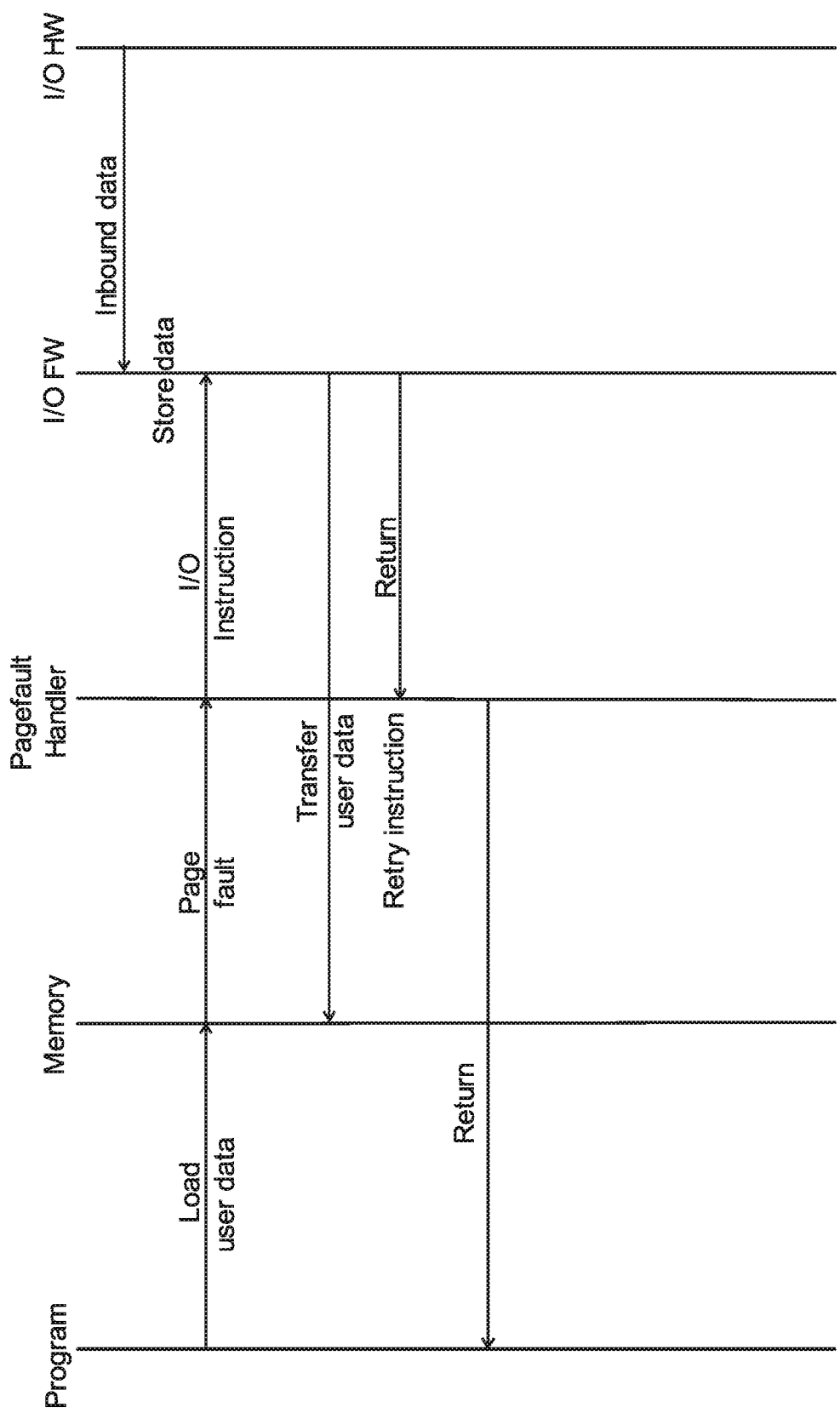
FIG. 9 depicts a schematic flow diagram of an exemplary data transfer from the I/O device, in accordance with an embodiment of the present invention.

FIG. 9 shows a further exemplary flow diagram of a method for executing a read operation using a memory in more detail. In contrast to the write actions described above in the context of FIGS. 5 to 7, the data transfer triggered by the page fault may be a transfer to the memory. Inbound data comprising the user data may be provided to the I/O firmware by the I/O hardware. The I/O firmware locally store the data, e.g., in a cache. This data transfer may, e.g., result from a read ahead as described above. The transfer of the user data from the I/O device, more precisely the I/O firmware, to the memory may, e.g., be triggered by accessing a trigger address of the trigger range. Alternatively, the data transfer may be triggered by accessing an address of the virtual address space mapping a physical address of the memory from which the user data are to be read. In other words, the program may issue an instruction to load the user data from the memory. In case of a load instruction, the same may already comprise sufficient information for identifying the I/O device from which the data is to be read. For example, user data may be read page wise, i.e., at least a complete memory page is loaded. Since the respective user data may have not been transferred to the memory yet, trying to load the respective user data from the memory may cause a page fault. Due to the page fault, an execution of the page fault handler may be initiated. The page fault handler sends I/O instructions to the I/O firmware. The I/O firmware, in case the inbound data stored by the I/O firmware comprises the user data to be loaded, causes the respective user data to be sent to the memory by the I/O firmware. In case the inbound data stored by the I/O firmware does not comprise the respective user data, the user data may be requested from the I/O hardware as described in FIG. 8. After sending the user data to the memory, the execution returns from the I/O firmware to the page fault handler. In case the data transfer has been triggered by accessing a trigger address of a trigger range which does not map the memory, an additional load instruction may be issued by the program accessing a virtual address mapping the physical address of the memory to which the user data has been transferred. In case the data transfer has been triggered by accessing a virtual address mapping a physical address of the memory from which the user data is to be read, the page fault handler may initiate a repetition of the load instruction which triggered the page fault. In other words, the respective load instruction may be retried. Since the requested user data has been transferred to the mapped memory, the load instruction is successful and the requested user data is successfully loaded. Then, the execution returns to the program, which may process the transferred user data.

According to an alternative implementation, the program and the page fault handler may negotiate a toggle pattern. For example, in order to read a file linearly, a toggle mechanism with two pages may be implemented, wherein one of the two pages is read to obtain data, while the other one of the two pages is configured to trigger a page fault, while advancing linearly through the data provided by an I/O device, like a disk. If load should be blocking, the page fault handler may delay an instruction retry.

Figure 10:
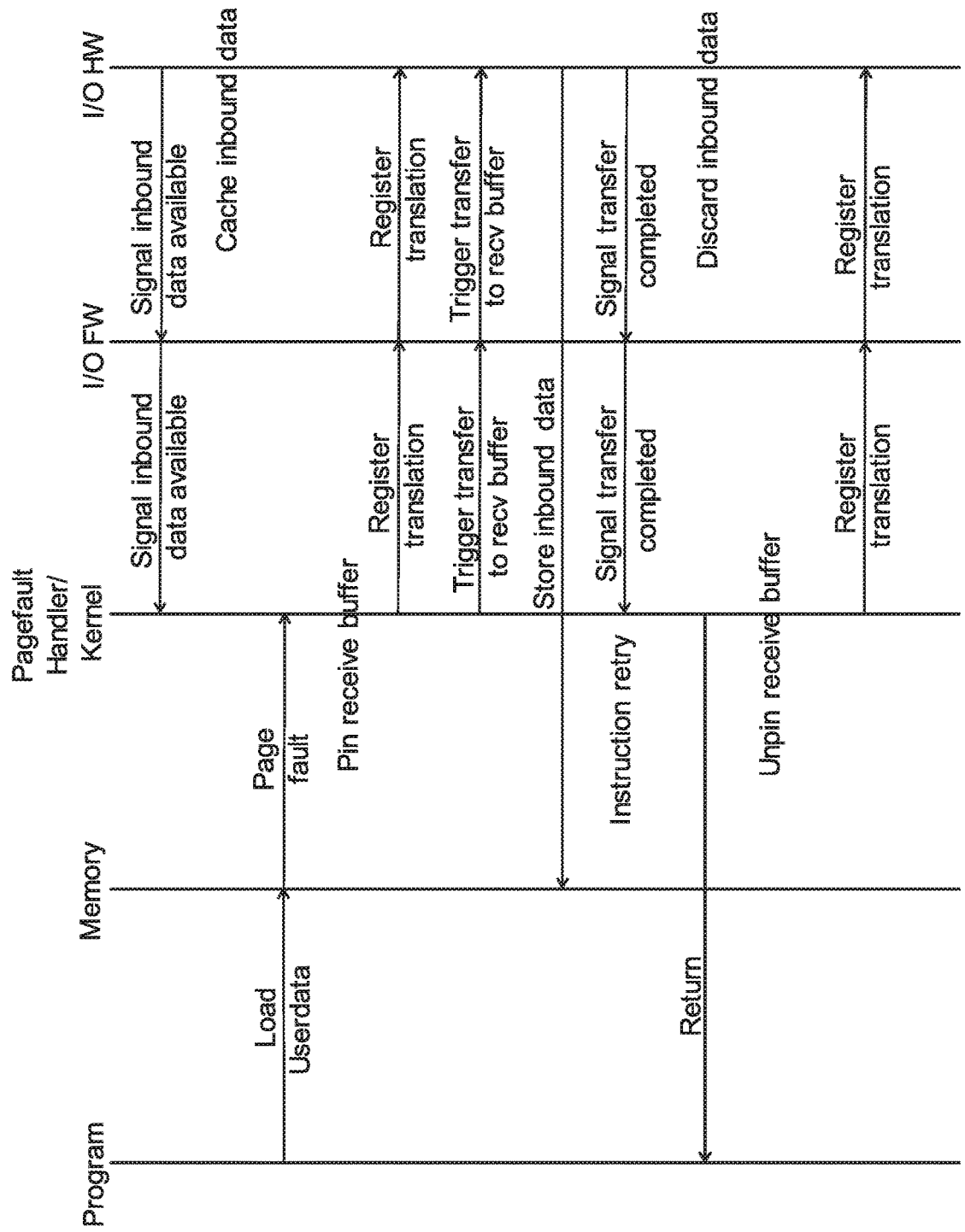
FIG. 10 depicts a schematic flow diagram of an exemplary data transfer from the I/O device, in accordance with an embodiment of the present invention.

FIG. 10 shows a further exemplary flow diagram illustrating a method for executing a read action comprising a pinning of data. A pinning may, e.g., be necessary when the user data to be transferred comprises a large amount of data. In order to prevent a swapping out of user data from memory, while the data transfer is still ongoing, the memory section to which the data is transferred may be pinned. Such a pinning may, e.g., be executed for each data transfer individually.

The I/O hardware may signal to the kernel via the I/O firmware that inbound data is available. The amount of inbound data may be too large for the I/O firmware to be cached. In inbound data may rather be cached by the I/O hardware. The data transfer may be triggered by a load instruction issued by the program to load user data from a virtual address mapping the memory. In case the memory does not comprise the user data to be loaded, a page fault may be caused and execution of the page fault handler initiated. The page fault handler may pin the section of the memory to which the user data is to be transferred. In order to enable the I/O hardware to address the memory section pinned for the user data, a registration of a translation of the virtual address under which the program intends to access the user data is initiated by the page fault handler. The translation provides an address usable by the I/O hardware. In response, the translation is registered by the I/O firmware and the I/O hardware. The transfer may be triggered by the page fault handler to send a command, e.g., a recv command, via the I/O firmware to the I/O hardware. In response to receiving the trigger command, the I/O hardware may be sent the inbound data requested to the memory using the registered translation. When the transfer is completed, the completion may be signaled by the I/O hardware via the I/O firmware to the page fault handler. Upon receiving the completion signal, the page fault handler may initiate a retry to execute the load request accessing the memory in order to load the user data. Since the user data has been transferred meanwhile, the load instruction will be successful this time and now further page fault may be caused. The inbound data may be discarded from the I/O hardware cache. The execution may return to the program in order to process the transferred data. Furthermore, the page fault handler unpins the pinned section of the memory to which the user data has been transferred. Meanwhile the respective data has been loaded by the program due to the repetition of the load instruction. Finally, an unregistering of the translations registered before may be initiated by the page fault handler for the I/O firmware as well as the I/O hardware.

Figure 11:
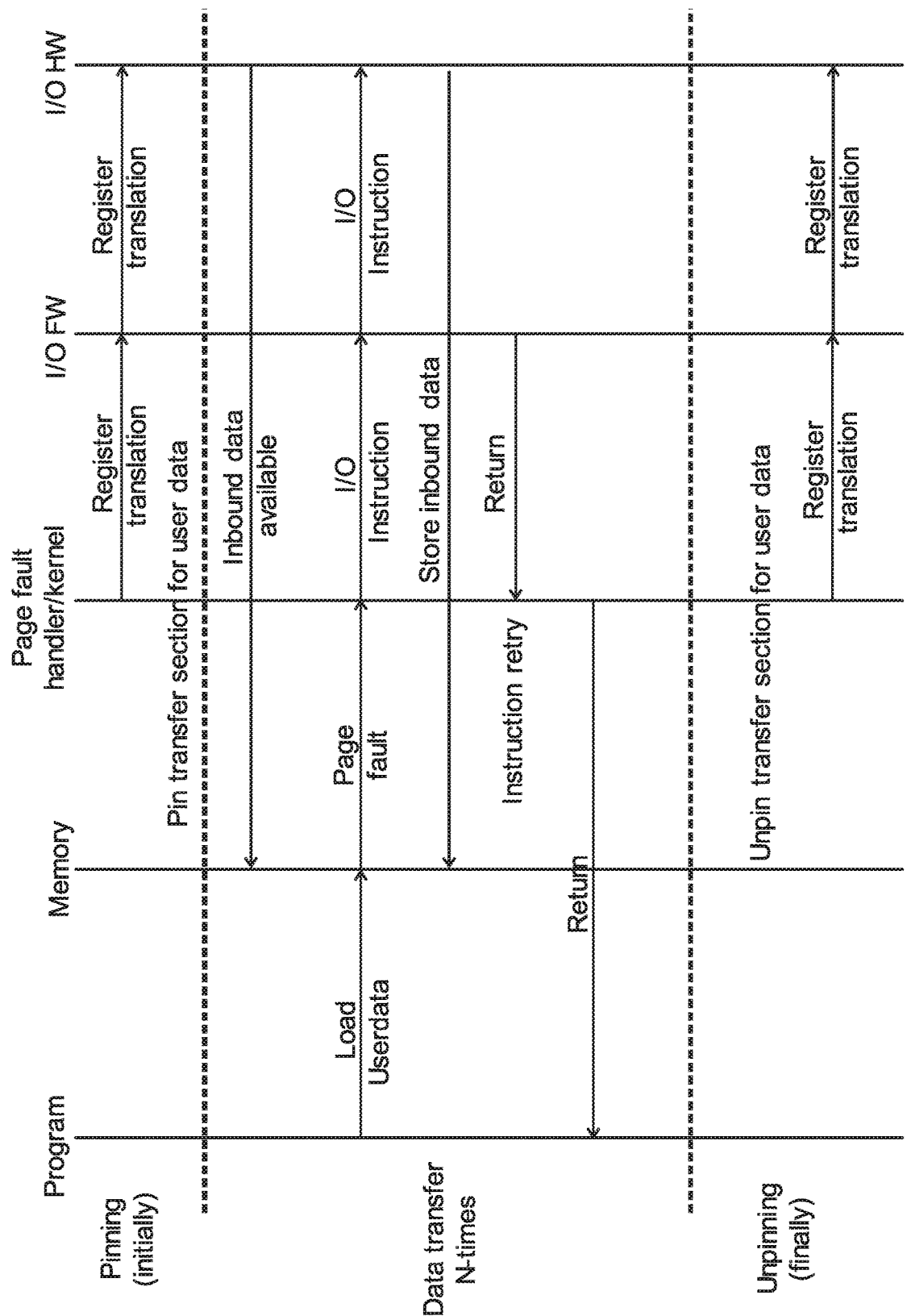
FIG. 11 depicts a schematic flow diagram of an exemplary data transfer from the I/O device, in accordance with an embodiment of the present invention.

FIG. 11 shows a further exemplary flow diagram illustrating a method for executing a read action comprising an ahead of time pinning of the section of the memory to which the user data is to be transferred rather than a on demand pinning as in FIG. 10. Initially, a transfer section of the memory is reserved for transferring data from the I/O device by an initial pinning process executed by the kernel. The initial pinning process comprises initiating a registration of a translation of the virtual addresses in the virtual address space used for accessing the pinned section to physical addresses usable by the I/O hardware of the I/O device. The respective registration is provided to the I/O firmware and further forwarded to the I/O hardware.

After the initial pinning process, one or more read operations may be executed. For example, the following read operation may be executed N times for different user data. The I/O hardware may signal to the memory that inbound data is available. The program accesses a virtual address mapping the pinned transfer section with a load instruction to load the user data. The accessing causes a page fault and initiates an execution of the page fault handler. The page fault handler sends I/O instructions via the I/O firmware to the I/O device. The I/O instructions may, e.g., comprise a recv command for the pinned section of the memory. The I/O firmware stores the requested data in the pinned section of the memory based on the I/O instructions provided. After retrieving the requested user data, the execution returns to the page fault handler which initiates a retrying of the load instruction for the user data which triggered the page fault. After imitating the retry, the execution may return to the program which may process the user data transferred.

Finally, an unpinning process is executed. This final unpinning process may, e.g., be executed when the execution of the program to which the virtual address space is assigned is terminated. The transfer section of the memory reserved for storing user data to be transferred is unpinned by the kernel. Furthermore, the kernel may initiate an unregistering of the translations of the virtual addresses of the transfer range of the virtual user space. In order to unregister the translation, the kernel may send a respective instruction to the I/O firmware, which may forward the unregistering instruction to the I/O hardware.

It is understood that one or more of the aforementioned embodiments of the invention may be combined as long as the combined embodiments are not mutually exclusive. Ordinal numbers, like e.g. 'first' and 'second', are used herein to indicate different element assigned with the same name, but do not necessarily establish any order of the respective elements.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the 'C' programming language or similar programming languages. The computer readable program instructions may execute entirely on the user computer system's computer, partly on the user computer system's computer, as a stand-alone software package, partly on the user computer system's computer and partly on a remote computer or entirely on the remote computer or server. In the latter scenario, the remote computer may be connected to the user computer system's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for transferring data between a computer program executed by a processor and an input/output device using a memory accessible by the computer program and the input/output device, wherein the memory is managed by an operating system which maps the memory with a virtual address space assigned to the computer program, wherein the method comprises:

providing by the operating system an additional trigger address range in the virtual address space, the trigger address range comprising at least one trigger address labeled invalid for causing a page fault when being accessed by the computer program and triggering the data transfer;

generating a page fault by accessing the trigger address by the computer program, the page fault comprising interrupting the execution of the computer program;

in response to the page fault, initiating an execution of a page fault handler of the operating system assigned for handling page faults caused by accessing virtual addresses comprised by the trigger address range;

acquiring information for identifying the data to be transferred by the page fault handler using the trigger address and providing the acquired information to the input/output device; and in response to the providing of the acquired information, transferring the identified data from the memory to the input/output device.

2. The method of claim 1, wherein the trigger address encodes metadata identifying the data to be transferred.

3. The method of claim 1, wherein the trigger address identifies metadata stored in the memory, the stored metadata identifying the data to be transferred.

4. The method of claim 3, wherein the acquired information for identifying the data to be transferred comprises a pointer to the metadata stored in the memory, wherein the input/output device uses the pointer to retrieve the metadata from the memory.

5. The method of claim 3, wherein the metadata comprises one or more of an identifier of the transfer operation to be executed, an identifier of the origin location of the data to be transferred, an identifier of the target location of the data to be transferred, and an identifier of the size of the data to be transferred.

6. The method of claim 1, wherein the computer program is a process virtual machine in a platform-independent runtime environment executing an application.

7. The method of claim 6, wherein the process virtual machine is a Java virtual machine in a Java runtime environment, wherein the application is a Java application, and wherein the memory is an off-heap memory.

8. The method of claim 1, wherein the data to be transferred is stored in the memory by the computer program.

9. The method of claim 1, wherein the accessing of the trigger address comprises using a data store instruction, and wherein the method further comprises initiating a skipping of the execution of the store instruction by the page fault handler when continuing the execution of the computer program by the processor.

10. The method of claim 1, wherein the memory is accessible by firmware of the input/output device and wherein the transferring of the identified data comprises retrieving the identified data from the memory by the firmware which provides the retrieved data to hardware of the input/output device.

11. The method of claim 1, wherein the memory is accessible by the hardware of the input/output device and wherein the transferring of the identified data comprises retrieving the identified data from the memory by the hardware.

12. The method of claim 11, wherein a translation of a virtual address of the identified data to be transferred to a physical address is registered and provided to the hardware of the input/output device by the page fault handler in order to enable the hardware to address the respective data.

13. The method of claim 11, wherein the retrieving of the identified data by the hardware of the input/output device is completed asynchronously, while the execution of the computer program by the processor is continued.

14. The method of claim 1, wherein the data to be transferred is pinned in the memory in response to the initiating of the execution of the page fault handler, wherein the pinning prevents the data to be transferred from being swapped out of the memory for being stored in an additional computer storage.

15. The method of claim 1, wherein a pinned transfer section comprised by the memory is provided for storing the data to be transferred, wherein the pinning of the transfer section prevents data comprised by the transfer section from being swapped out of the memory for being stored in the additional computer storage.

16. The method of claim 1, wherein the data is further transferred from the input/output device to the memory.

17. The method of claim 16, wherein the accessing of the trigger address comprises using a data load instruction, and wherein the method further comprises initiating a repetition of the execution of the load instruction by the page fault handler when continuing the execution of the computer program by the processor.

18. A computer system comprising a memory, a processor for executing a computer program and an input/output device, wherein the computer system is configured for transferring data between the computer program and the input/output device using a memory accessible by the computer program and the input/output device, wherein the memory is managed by an operating system which maps the memory with a virtual address space assigned to the computer program, wherein the transferring comprises:

providing by the operating system an additional trigger address range in the virtual address space, the trigger address range comprising at least one trigger address labeled invalid for causing a page fault when being accessed by the computer program and triggering the data transfer;

generating a page fault by accessing the trigger address by the computer program, the page fault comprising interrupting the execution of the computer program;

in response to the page fault, initiating an execution of a page fault handler of the operating system assigned for handling page faults caused by accessing virtual addresses comprised by the trigger address range;

acquiring information for identifying the data to be transferred by the page fault handler using the trigger address and providing the acquired information to the input/output device; and in response to the providing of the acquired information, transferring the identified data from the memory to the input/output device.

19. A computer program product comprising a computer-readable storage medium having machine executable program instructions embodied therewith, the machine executable program instructions being configured to implement a method for transferring data between a computer program executed by a processor and an input/output device using a memory accessible by the computer program and the input/output device, wherein the memory is managed by an operating system which maps the memory with a virtual address space assigned to the computer program, wherein the method comprises:

providing by the operating system an additional trigger address range in the virtual address space, the trigger address range comprising at least one trigger address labeled invalid for causing a page fault when being accessed by the computer program and triggering the data transfer;

generating a page fault by accessing the trigger address by the computer program, the page fault comprising interrupting the execution of the computer program;

in response to the page fault, initiating an execution of a page fault handler of the operating system assigned for handling page faults caused by accessing virtual addresses comprised by the trigger address range;

acquiring information for identifying the data to be transferred by the page fault handler using the trigger address and providing the acquired information to the input/output device; and in response to the providing of the acquired information, transferring the identified data from the memory to the input/output device.

* * * * *